US011990690B2

(12) United States Patent
Li et al.

(10) Patent No.: US 11,990,690 B2
(45) Date of Patent: May 21, 2024

(54) ANTENNA AND COMMUNICATION DEVICE

(71) Applicants: Beijing BOE Technology Development Co., Ltd., Beijing (CN); BOE TECHNOLOGY GROUP CO., LTD., Beijing (CN)

(72) Inventors: Chunxin Li, Beijing (CN); Jingwen Guo, Beijing (CN); Qianhong Wu, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 43 days.

(21) Appl. No.: 17/552,735

(22) Filed: Dec. 16, 2021

(65) Prior Publication Data

US 2022/0271432 A1 Aug. 25, 2022

(30) Foreign Application Priority Data

Feb. 24, 2021 (CN) ......................... 202110208950.3

(51) Int. Cl.
*H01Q 7/00* (2006.01)
*H01Q 9/04* (2006.01)

(52) U.S. Cl.
CPC ............. *H01Q 7/00* (2013.01); *H01Q 9/0407* (2013.01)

(58) Field of Classification Search
CPC ........ H01Q 7/00; H01Q 9/0407; H01Q 5/321; H01Q 21/28; H01Q 1/38; H01Q 1/50; H01Q 5/10; H01Q 5/20
See application file for complete search history.

(56) References Cited

U.S. PATENT DOCUMENTS 6,057,803 A * 5/2000 Kane ...................... H01Q 21/29 343/742
10,608,321 B2 * 3/2020 Jiang ...................... H01Q 1/528
(Continued)

FOREIGN PATENT DOCUMENTS

CN 102629708 A 8/2012
CN 102800478 A 11/2012
(Continued)

OTHER PUBLICATIONS

Liu et al. CN107978861A Machine Translation, May 1, 2018 (Year: 2018).*
China Patent Office, Office Action dated Apr. 20, 2023, for corresponding Chinese application 202110208950.3.

*Primary Examiner* — Hai V Tran
*Assistant Examiner* — Michael M Bouizza
(74) *Attorney, Agent, or Firm* — HOUTTEMAN LAW LLC

(57) ABSTRACT

The present disclosure provides an antenna and a communication device, the antenna includes a dielectric substrate, a first radiating element, a second radiating element and a switching element, the second radiating element surrounds the first radiating element, the second radiating element is of an open-loop structure, at least one first groove is provided in the first radiating element, each switching element corresponds to one first groove, the switching element includes a membrane bridge and a signal electrode, the signal electrode is arranged on the dielectric substrate, coupled to the second radiating element, and insulated from the first radiating element, the membrane bridge is arranged on a side of the first radiating element away from the dielectric substrate, each membrane bridge crosses over one first groove, and at least part of the signal electrode is located in a space defined by the membrane bridge and the first groove.

14 Claims, 3 Drawing Sheets

(56) References Cited

U.S. PATENT DOCUMENTS

| | | | | |
|---|---|---|---|---|
| 2009/0156191 | A1 | 6/2009 | Hassan et al. | |
| 2009/0237173 | A1* | 9/2009 | Ziaei | H01P 1/127 333/1.1 |
| 2009/0286491 | A1 | 11/2009 | Ziaei et al. | |
| 2010/0033397 | A1* | 2/2010 | Narasimhan | H01Q 1/38 343/860 |
| 2010/0321256 | A1 | 12/2010 | Onaka et al. | |
| 2016/0093939 | A1* | 3/2016 | Kim | H01Q 1/44 343/720 |
| 2018/0123244 | A1* | 5/2018 | An | H01Q 1/36 |
| 2018/0175481 | A1 | 6/2018 | Yin et al. | |
| 2019/0067803 | A1* | 2/2019 | Kang | G04R 60/06 |
| 2019/0089057 | A1* | 3/2019 | Mitchell | H01Q 5/42 |
| 2021/0126368 | A1* | 4/2021 | Hsiao | H01Q 1/48 |

FOREIGN PATENT DOCUMENTS

| | | | | |
|---|---|---|---|---|
| CN | 103887602 | A | | 6/2014 |
| CN | 106067601 | A | | 11/2016 |
| CN | 107342456 | A | | 11/2017 |
| CN | 107978861 | A | * | 5/2018 |
| CN | 107978861 | A | | 5/2018 |
| CN | 109860986 | A | | 6/2019 |
| CN | 109860997 | A | | 6/2019 |
| CN | 109980368 | A | | 7/2019 |
| CN | 110176673 | A | | 8/2019 |
| EP | 2840651 | A1 | | 2/2015 |
| WO | WO2020233476 | A1 | | 11/2020 |

* cited by examiner

ANTENNA AND COMMUNICATION DEVICE

CROSS-REFERENCE TO RELATED APPLICATIONS

The present application claims the priority of Chinese Patent Application No. 202110208950.3, filed on Feb. 24, 2021, the contents of which are incorporated herein in their entirety by reference.

TECHNICAL FIELD

The present disclosure relates to the field of wireless communication technology, and particularly relates to an antenna and a communication device.

BACKGROUND

As an important part of wireless communication, a performance of an antenna directly affects a quality of information communication, and in order to meet requirements of science and technology and industrial development, the antenna is developing towards ultra wide band, function diversification, miniaturization and intellectualization.

Generally, the number of radiating elements of the antenna may be increased to improve the performance of the antenna, but too many radiating elements may cause electromagnetic interference between the elements, and simultaneously, the antenna may have a too large size, which is not favorable for miniaturization. A frequency reconfigurable antenna can enable a frequency of the antenna to be reconfigurable within a certain range by adding a control switch, and a resonant frequency of the antenna can be adjusted without increasing or reducing the number of radiating elements of the antenna, so that the frequency reconfigurable antenna has advantages of having a simple structure and a small occupied space.

SUMMARY

In a first aspect, an embodiment of the present disclosure provides an antenna, including:

a dielectric substrate;

a first radiating element and a second radiating element which are arranged on the dielectric substrate, where the second radiating element is arranged around the first radiating element and is of an open-loop structure, and at least one first groove is arranged in the first radiating element;

the antenna further includes:

at least one switching element, where each switching element is arranged corresponding to one first groove and includes a membrane bridge and a signal electrode, and the signal electrode is arranged on the dielectric substrate, coupled to the second radiating element and insulated from the first radiating element; the membrane bridge is arranged on a side of the first radiating element away from the dielectric substrate, each membrane bridge crosses over one first groove, and at least part of the signal electrode is positioned in a space defined by the membrane bridge and the first groove.

In some implementations, the first radiating element is provided with the first groove in at least one edge thereof.

In some implementations, two ends of the membrane bridge are respectively coupled to the first radiating element.

In some implementations, the antenna further includes a feeding structure disposed at a position of opening of the second radiating element and coupled to the first radiating element.

In some implementations, a side of the first radiating element opposite to a side where the first groove is provided is with a second groove, and the feeding structure is disposed in the second groove and coupled to the first radiating element.

In some implementations, at least one through slot is disposed in the second radiating element, and the through slot divides the second radiating element into a plurality of parts, and each part of the second radiating element is disposed corresponding to at least one switching element.

In some implementations, the second radiating element and the signal electrode are formed into one piece.

In some implementations, the first radiating element and the feeding structure are formed into one piece.

In some implementations, the first radiating element and the second radiating element are disposed in a same layer and are made of a same material.

In some implementations, a side of the signal electrode away from the dielectric substrate is provided thereon with an insulating layer to insulate the signal electrode from the first radiating element.

In a second aspect, an embodiment of the present disclosure provides a communication device, which includes the antenna described above.

DESCRIPTION OF EMBODIMENTS

In order that those skilled in the art will better understand technical solutions of the present disclosure, the following detailed description is given with reference to the accompanying drawings and the specific embodiments.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "include" or "comprise", and the like, means that the element or item appearing in front of the word includes the element or item listed after the word, and the equivalent thereof, but does not exclude other elements or items. The terms "connected" or "coupled" and the like are not restricted to physical or mechanical connections, but may include electrical connections, whether direct or indirect. Terms "upper", "lower", "left", "right", and the like are used only to indicate relative positional relationships, and when the absolute position of the object being described is changed, the relative positional relationships may also be changed accordingly.

In the related art, a frequency reconfigurable antenna can adopt a semiconductor switch, a variable capacitance diode, a liquid crystal and the like as a control switch to realize frequency reconfiguration, however, the semiconductor switch or the variable capacitance diode has obvious influence on gain and efficiency index of the antenna, and a liquid crystal reconfigurable antenna has a relatively long response time. Moreover, the frequency reconfigurable antenna in the related art has problems of large size and small frequency configuration and adjustment range, and is not beneficial to application research of an antenna array.

At least in view of one of above technical problems, embodiments of the present disclosure provide an antenna and a communication device, which are described in further detail below with reference to the accompanying drawings and the detailed description.

Figure 1:
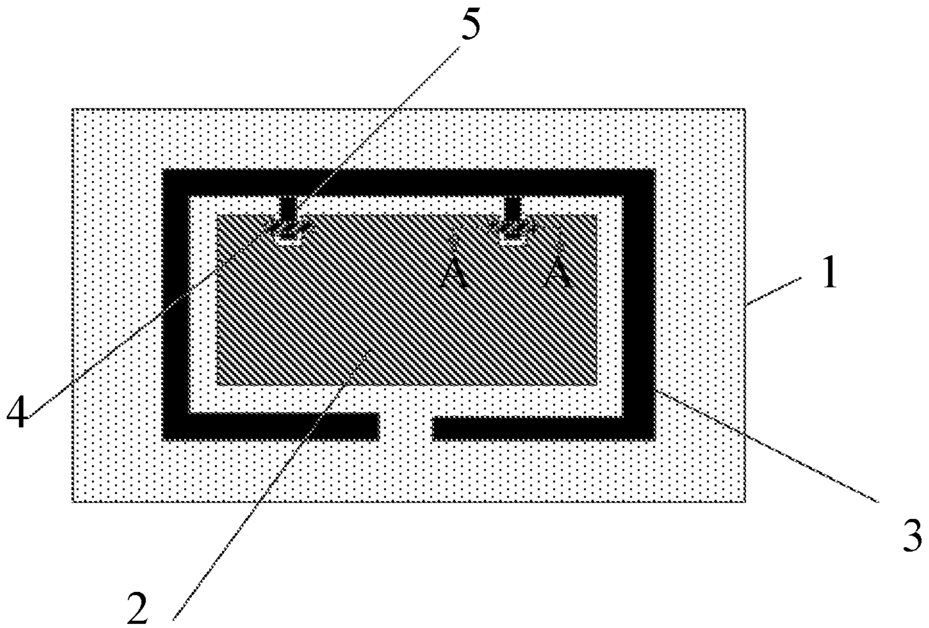
FIG. 1 is a schematic structural diagram of an antenna according to an embodiment of the present disclosure.
Figure 2:
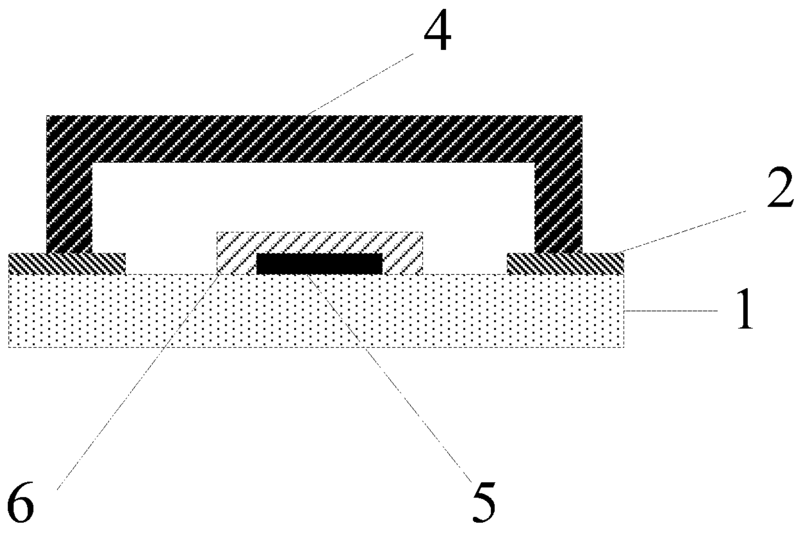
FIG. 2 is a schematic cross-sectional view of the antenna shown in FIG. 1 taken along line A-A.

In a first aspect, FIG. 1 is a schematic structural diagram of an antenna according to an embodiment of the present disclosure, and FIG. 2 is a schematic cross-sectional view of the antenna shown in FIG. 1 taken along line A-A, as shown in FIG. 1 and FIG. 2, the antenna in the embodiment of the present disclosure includes a dielectric substrate 1, a first radiating element 2, a second radiating element 3, and a switching element. A back surface of the dielectric substrate 1 is a metal ground, the first radiating element 2 and the second radiating element 3 are both disposed on the dielectric substrate 1, the second radiating element 3 is disposed around the first radiating element 2, and the second radiating element 3 is of an open-loop structure, that is, the second radiating element 3 has an opening. The first radiating element 2 is provided with at least one first groove therein, and in the embodiment of the present disclosure, two first grooves being provided in the first radiating element 2 is taken as an example, but the number of the first grooves is not particularly limited.

In the embodiment of the present disclosure, each switching element of the antenna is disposed corresponding to one first groove, for example, switching elements are disposed in one-to-one correspondence with the first grooves. Each switching element includes a membrane bridge 4 and a signal electrode 5, the signal electrode 5 is arranged on the dielectric substrate 1, coupled to the second radiating element 3 and arranged insulated from the first radiating element 2, for example, an insulating layer 6 is arranged on a side of the signal electrode 5 away from the dielectric substrate 1 to insulate the signal electrode 5 from the second radiating element 3. The membrane bridge 4 is arranged on a side of the first radiating element 2 away from the dielectric substrate 1, each membrane bridge 4 crosses over one first groove and is coupled to the first radiating element 2, and at least part of the signal electrode 5 is located in a space defined by the membrane bridge 4 and the first groove.

Specifically, as shown in FIG. 2, the membrane bridge 4 is suspended above the signal electrode 5 and is not contact with the insulating layer 6 above the signal electrode 5, the membrane bridge 4 is arched and includes a bridge deck structure, the bridge deck structure of the membrane bridge 4 has certain elasticity, and at least part of the signal electrode 5 is located in a space formed between the bridge deck structure and the dielectric substrate 1. When a bias voltage is applied between the membrane bridge 4 and the signal electrode 5, under an action of an electrostatic force, the bridge deck structure of the membrane bridge 4 moves in a direction (up-down direction as shown in FIG. 2) perpendicular to the signal electrode 5, that is, when a direct current bias voltage is input to the membrane bridge 4, a distance between the bridge deck structure of the membrane bridge 4 and the signal electrode 5 can be changed, a capacitance of a capacitor formed by the bridge deck structure of the membrane bridge 4 and the signal electrode 5 can be changed, so that the switching element can be controlled to be on or off.

In the embodiment of the present disclosure, since the membrane bridge 4 of the switching element crosses over the first groove of the first radiating element 2 and is suspended above the insulating layer 6, a capacitive structure is formed between the membrane bridge 4 and the signal electrode 5, a height of the bridge deck structure of the membrane bridge 4 is changed by applying a bias voltage between the first radiating element 2 and the signal electrode 5 or between the first radiating element 2 and the second radiating element 3, and thus the switching element can be controlled to be on or off. Specifically, when no bias voltage is applied between the first radiating element 2 and the signal electrode 5, the height of the bridge deck structure of the membrane bridge 4 is not changed, the switching element is turned off and in an off state, and no microwave signal can pass through the switching element, and in such case, electromagnetic wave energy is mainly radiated by the first radiating element 2; when a bias voltage is applied between the first radiating element 2 and the signal electrode 5, under an action of the bias voltage, the height of the bridge deck structure of the membrane bridge 4 is changed, the capacitance between the membrane bridge 4 and the signal electrode 5 is increased, when the capacitance between the membrane bridge 4 and the signal electrode 5 is maximized, the switching element is turned on and in an on state, a microwave signal can be coupled to the second radiating element 3 through the switching element, and in such case, the first radiating element 2 and the second radiating element 3 jointly radiate electromagnetic wave energy, so that a size of a radiating element of the antenna is changed, and an operation frequency of the antenna is accordingly changed. Compared with the frequency reconfigurable antenna in the related art, the antenna in the embodiment of the present disclosure has advantages of having a smaller volume and a simpler structure.

By simulating the antenna shown in FIG. 1, when the switching element is in the off state, the antenna has a resonant frequency of 22.5 GHz, and a gain of 3.99 dB; when the switching element is in the on state, the resonant frequency of the antenna is 21 GHz and the gain of the antenna is 4.32 dB. Simulation results show that reconfiguration of the frequency of the antenna can be realized by controlling the switching element to be on or off, and the antenna has two resonant frequencies of 21 GHz and 22.5 GHz. It is to be understood that the number of the switching elements in the embodiment of the present disclosure may be selected according to circumstances, and is not limited specifically herein.

It should be noted that, in the embodiment of the present disclosure, the first radiating element 2 and the second radiating element 3 may have a radiating patch structure, and the signal electrode 5 may have a rectangular micro-strip structure, and it is understood that the first radiating element 2, the second radiating element 3, and the signal electrode 5 may also have other structures, which are not limited in particular herein.

In addition, in the embodiment of the present disclosure, the switching element being a micro electro mechanical system (MEMS) switch is taken as an example for explanation, and it is to be understood that the switching element may also be another element that can achieve a same function, and is not limited specifically herein.

In some implementations, at least one edge of the first radiating element 2 is provided with the first groove therein. Specifically, as shown in FIGS. 1 and 2, the first grooves are provided at a top edge of the first radiating element 2, each membrane bridge 4 crosses over the first groove, and at least part of the signal electrode 5 is located in a space defined by the membrane bridge 4 and the first groove. The signal electrode 5 is coupled to the second radiating element 3, and the insulating layer 6 is arranged on the side of the signal electrode 5 away from the dielectric substrate 1. By applying a bias voltage between the first radiating element 2 and the signal electrode 5 or between the first radiating element 2 and the second radiating element 3, the height of the bridge deck structure of the membrane bridge 4 can be changed under the action of the bias voltage, the capacitance between the membrane bridge 4 and the signal electrode 5 is increased, when the capacitance between the membrane bridge 4 and the signal electrode 5 is maximized, the switching element is turned on and in the on state, and a microwave signal can be coupled to the second radiating element 3 through the switching element, so that the size of the radiating element of the antenna is changed, and in such case, the first radiating element 2 and the second radiating element 3 jointly radiate electromagnetic wave energy, and an operation frequency of the antenna is accordingly changed. Compared with the frequency reconfigurable antenna in the related art, the antenna in the embodiment of the present disclosure has advantages of having a smaller volume and a simpler structure.

It is understood that the first groove may also be provided at any edge of the first radiating element 2, for example, the first groove may be provided at a left or right edge of the first radiating element 2, and the first groove may also be provided at a bottom edge of the first radiating element 2. The first groove may be provided according to specific situations, and is not particularly limited herein.

In some implementations, two ends of the membrane bridge 4 are respectively coupled to the first radiating element 2. In the embodiment of the present disclosure, since the membrane bridge 4 of the switching element crosses over the first groove of the first radiating element 2, and two ends of the membrane bridge 4 are respectively coupled to the first radiating element 2 directly, there is no need to additionally design a fixing structure required by anchor points at two sides of the membrane bridge 4, and the structure of the switching element is simplified. Further, since a bridging distance of the membrane bridge 4 is relatively small, the membrane bridge 4 is not prone to be collapsed during formation of the membrane bridge 4, resulting in an improved yield.

Figure 3:
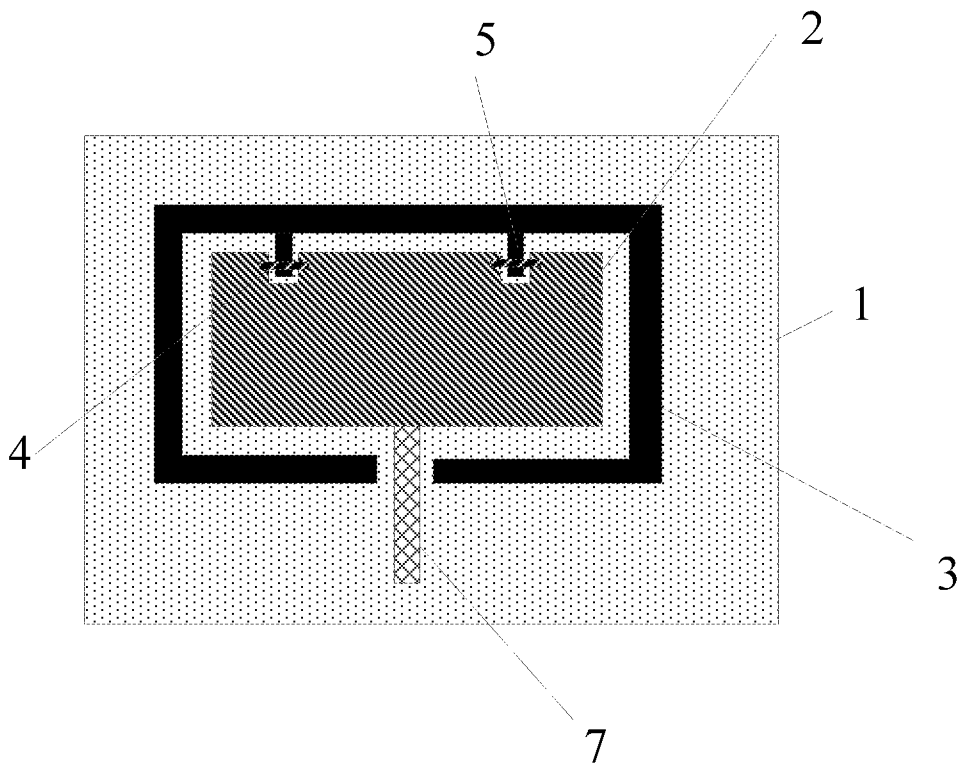
FIG. 3 is another schematic structural diagram of an antenna according to an embodiment of the present disclosure.

FIG. 3 is another schematic structural diagram of an antenna according to an embodiment of the present disclosure, and as shown in FIG. 3, the antenna further includes a feeding structure 7, where the feeding structure 7 is disposed at a position of opening of the second radiating element 3 and coupled to the first radiating element 2. In the embodiment of the present disclosure, since the feeding structure 7 is provided, a bias voltage can be applied to the first radiating element 2 through the feeding structure 7, and in a case where a bias voltage is also applied to the signal electrode 5, the height of the bridge deck structure of the membrane bridge 4 can be changed, thereby controlling the switching element to be on or off. The feeding structure 7 may be any structure for feeding, and the feeding structure 7 of the embodiment of the present disclosure may be of a micro-strip structure.

Figure 4:
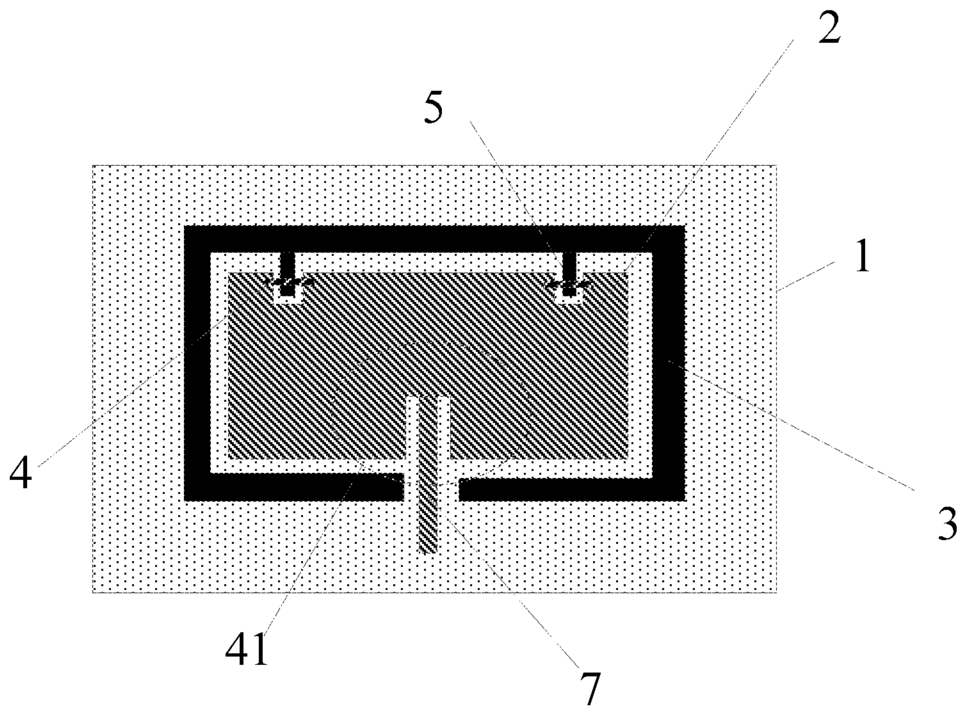
FIG. 4 is further another schematic structural diagram of an antenna according to an embodiment of the present disclosure.

FIG. 4 is further another schematic structural diagram of an antenna according to an embodiment of the present disclosure, and as shown in FIG. 4, a side of the first radiating element 2 opposite to a side where the first groove is provided is provided with a second groove 41, and the feeding structure 7 is disposed in the second groove 41 and coupled to the first radiating element 2. By providing the second groove 41 at a joint of the feeding structure 7 and the first radiating element 2, a microwave signal loss at the joint of the feeding structure 7 and the first radiating element 2 can be reduced, and a transmission of the microwave signal is ensured. It is understood that, as long as the feeding structure 7 is disposed in the second groove 41 and the feeding structure 7 is coupled to the first radiating element 2, the second groove 41 may be disposed at any side of the first radiating element 2, and the embodiment of the present disclosure is only described by taking the second groove 41 being disposed at the side of the first radiating element 2 opposite to the side where the first groove is disposed as an example.

In the embodiment of the present disclosure, at least one through slot is disposed in the second radiating element 3, and the through slot divides the second radiating element 3 into a plurality of parts, and each part of the second radiating element 3 is disposed corresponding to at least one switching element. In the embodiment of the present disclosure, the size of the radiating element can be controlled by controlling the switching element to be on or off, so that multi-frequency switching of the antenna is realized.

Figure 5:
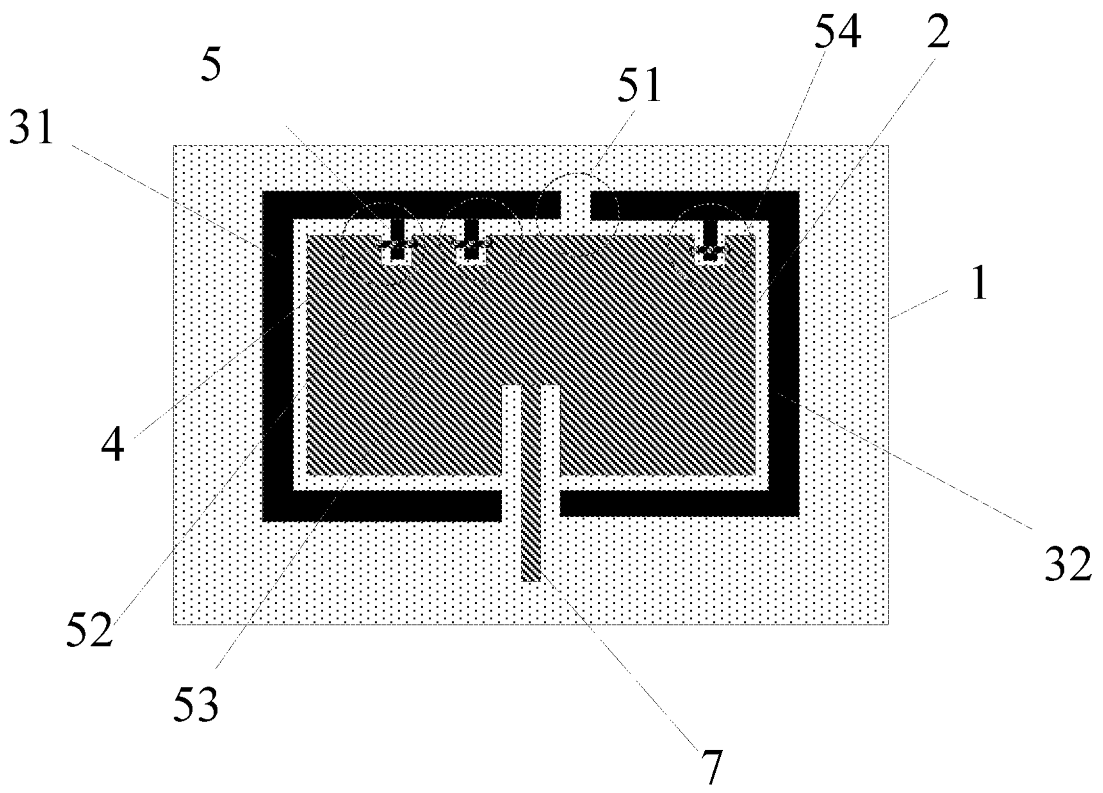
FIG. 5 is still further another schematic structural diagram of an antenna according to an embodiment of the present disclosure.

For example, FIG. 5 is still further another schematic structural diagram of an antenna according to an embodiment of the present disclosure, and as shown in FIG. 5, a through slot 51 is provided in the second radiating element 3, and the through slot 51 divides the second radiating element 3 into two parts, namely, a first part 31 and a second part 32. The first part 31 of the second radiating element 3 is provided with a first switching element 52 and a second switching element 53 in correspondence, and the second part 32 of the second radiating element 3 is provided with a third switching element 54 in correspondence. When no bias voltage is applied to the first switching element 52, the second switching element 53, and the third switching element 54, the first switching element 52, the second switching element 53, and the third switching element 54 are turned off and in an off state, and in such case, electromagnetic wave energy is radiated only by the first radiating element 2. When only the first switching element 52 and the second switching element 53 are applied with a bias voltage, both the first switching element 52 and the second switching element 53 are turned on and the microwave signal can be coupled to the first part 31 of the second radiating element 3 through the first switching element 52 and the second switching element 53, i.e., electromagnetic wave energy is now jointly radiated by the first radiating element 2 and the first part 31 of the second radiating element 3. When a bias voltage is applied to only the third switching element 54, the third switching element 54 is turned on and in an on stage, the microwave signal can be coupled to the second part 32 of the second radiating element 3 through the third switching element 54, i.e., electromagnetic energy is now radiated jointly by the first radiating element 2 and the second part 32 of the second radiating element 3. When bias voltages are applied to the first switching element 52, the second switching element 53 and the third switching element 54 simultaneously, the first switching element 52, the second switching element 53 and the third switching element 54 are all turned on and in the on state, the microwave signal can be coupled to the first part 31 of the second radiating element 3 through the first switching element 52 and the second switching element 53, and coupled to the second part 32 of the second radiating element 3 through the third switching element 54, that is, in such case, electromagnetic wave energy is radiated jointly by the first radiating element 2, the first part 31 and the second part 32 of the second radiating element 3, and by controlling the switching elements to be turned on or off, multi-frequency switching of the antenna is realized.

By simulating the antenna shown in FIG. 5, when the first switching element 52, the second switching element 53, and the third switching element 54 are all turned off and in the off state, the resonant frequency of the antenna is 23 GHz; when the first switching element 52, the second switching element 53, and the third switching element 54 are all turned on and in the on state, the resonant frequency of the antenna is 21.5 GHz; when the first switching element 52 and the second switching element 53 are both turned off and in the off state and the third switching element 54 is turned on and in the on state, the resonant frequency of the antenna is 22.5 GHz; when the first switching element 52 and the second switching element 53 are both turned on and in the on state and the third switching element 54 is turned off and in the off state, the resonant frequency of the antenna is 22 GHz. Simulation results show that multi-frequency switching of the antenna is achieved by controlling the state of the switching elements, and the antenna has four resonant frequencies of 21.5 GHz, 22 GHz, 22.5 GHz and 23 GHz.

It can be understood that the second radiating element 3 may be divided into a plurality of parts by providing a plurality of through slots 51 in the second radiating element 3, and the size of the radiating element can be controlled by controlling the on or off state of the switching elements, as long as each part of the second radiating element 3 is provided with the switching element correspondingly, so that the operation frequency of the antenna can be changed. The number and positions of the through slots 51 may be selected according to circumstances, and are not particularly limited herein.

In some implementations, the second radiating element 3 and the signal electrode 5 may be separate structures or may be formed into one piece. In some implementations, the second radiating element 3 and the signal electrode 5 are formed into one piece, that is, the second radiating element 3 and the signal electrode 5 are disposed in a same layer and are formed of a same material through one patterning process. The "patterning process" refers to steps of forming a structure having a specific pattern, and may include a photolithography process, an imprinting process, an inkjet printing process, and the like. By forming the second radiating element 3 and the signal electrode 5 into one piece, the number of manufacturing steps is reduced, resulting in a reduced cost.

In some implementations, the first radiating element 2 and the feeding structure 7 may be separate structures or may be formed into one piece. In some implementations, the first radiating element 2 and the feeding structure 7 are formed into one piece, that is, the first radiating element 2 and the feeding structure 7 are disposed in a same layer and are formed of a same material through one patterning process. By forming the first radiating element 2 and the feeding structure 7 into one piece, the number of manufacturing steps is reduced, resulting in a reduced cost.

In some implementations, the first radiating element 2 and the second radiating element 3 are provided in a same layer and are made of a same material. By providing the first radiating element 2 and the second radiating element 3 in the same layer, and forming the first radiating element 2 and the second radiating element 3 by the same material, the number of manufacturing steps is reduced, resulting in a reduced cost.

In a second aspect, an embodiment of the present disclosure provides a communication device, which includes the antenna described above. The communication device can realize the effect of the antenna, and repeated description is omitted here.

Specifically, the communication device may be a smart phone, a tablet computer, a smart computer, or the like.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are also considered to fall within the scope of the present disclosure.

The invention claimed is:

1. An antenna, comprising:

a dielectric substrate;

a first radiating element and a second radiating element which are arranged on the dielectric substrate, wherein the second radiating element is arranged around the first radiating element and is of an open-loop structure, and at least one first groove is arranged in at least one edge of the first radiating element;

the antenna further comprises:

at least one switching element, each switching element corresponds to one of the at least one first groove; the switching element comprises a membrane bridge and a signal electrode, and the signal electrode is arranged on the dielectric substrate, coupled to the second radiating element and insulated from the first radiating element; the membrane bridge is arranged on a side of the first radiating element away from the dielectric substrate, each membrane bridge crosses one of the at least one first groove, and at least part of the signal electrode is positioned in a space defined by the membrane bridge and the first groove, wherein the second radiating element has at least one through slot disposed therein, the through slot divides the second radiating element into two parts, wherein each part of the second radiating element is disposed in correspondence with at least one switching element, and the two parts of the second radiating element are respectively in correspondence with different numbers of switching elements.

2. The antenna of claim 1, wherein two ends of the membrane bridge are respectively coupled to the first radiating element.

3. The antenna of claim 2, wherein the second radiating element and the signal electrode are formed into one piece.

4. The antenna of claim 2, wherein the first radiating element and the second radiating element are disposed in a same layer and are made of a same material.

5. The antenna of claim 1, further comprising a feeding structure disposed at a position of opening of the second radiating element and coupled to the first radiating element.

6. The antenna of claim 5, wherein a side of the first radiating element opposite to a side where the first groove is disposed is provided with a second groove, the feeding structure is disposed in the second groove and coupled to the first radiating element.

7. The antenna of claim 6, wherein the first radiating element and the feeding structure are formed into one piece.

8. The antenna of claim 5, wherein the first radiating element and the feeding structure are formed into one piece.

9. The antenna of claim 5, wherein the second radiating element and the signal electrode are formed into one piece.

10. The antenna of claim 5, wherein the first radiating element and the second radiating element are disposed in a same layer and are made of a same material.

11. The antenna of claim 1, wherein the second radiating element and the signal electrode are formed into one piece.

12. The antenna of claim 1, wherein the first radiating element and the second radiating element are disposed in a same layer and are made of a same material.

13. The antenna of claim 1, wherein a side of the signal electrode away from the dielectric substrate is provided with an insulating layer for insulating the signal electrode from the first radiating element.

14. A communication device, comprising the antenna of claim 1.

* * * * *